United States Patent [19]

Moonier

[11] 3,757,096

[45] Sept. 4, 1973

[54] WIDE BAND DIGITAL SINE WAVE SYNTHESIZER

[75] Inventor: Brian G. Moonier, Los Angeles, Calif.

[73] Assignee: The Singer Company, New York, N.Y.

[22] Filed: Apr. 24, 1972

[21] Appl. No.: 247,066

[52] U.S. Cl. .................................. 235/152, 328/14

[51] Int. Cl. .......................................... H03b 19/14

[58] Field of Search ........................... 235/152, 197; 328/14

[56] References Cited

UNITED STATES PATENTS

| | | | |
|---|---|---|---|
| 3,657,657 | 4/1972 | Jefferson | 328/14 |
| 3,649,821 | 3/1972 | Gumacos | 235/152 |
| 3,447,096 | 5/1969 | Fischer et al. | 331/49 |
| 3,654,450 | 4/1922 | Webb | 235/197 |
| 3,665,323 | 5/1972 | Peterson | 328/14 |

*Primary Examiner*—Charles E. Atkinson
*Assistant Examiner*—David H. Malzahn
*Attorney*—Linval B. Castle

[57] ABSTRACT

A solid state tone generator is provided which is capable of digitally synthesizing sine wave tones, and which has particular utility for producing tones for testing selective call paging receivers. The tone generator may be set to generate a plurality of tones, either continuously or in bursts, and either simultaneously or in sequence, so that it may be easily adapted for testing a wide variety of paging receivers used in a wide variety of different paging systems. Each of the tones may be set to any selected frequency in a range extending from 0.1 Hz to 9999.9 Hz. As will be described, decade rate scalers (DRS) are used in conjunction with a crystal oscillator to provide a digital output corresponding to a selected tone, and the digital output is then ultimately converted into a sine wave of the selected tone frequency.

2 Claims, 2 Drawing Figures

WIDE BAND DIGITAL SINE WAVE SYNTHESIZER

BACKGROUND OF THE INVENTION

A wide variety of selective call receivers, and a wide variety of paging systems incorporating such receivers, are now in existence. The receivers are normally carried by the individuals, and a particular receiver emits a distinct signal in response to a predetermined tone combination which is transmitted over the system, and which serves to select the receiver. Each receiver responds to its own tone combination to generate a local signal which informs the person carrying the receiver that there is a message for him.

The tones and tone combinations used in the various present day systems to select the receivers are usually frequency modulated on an appropriate carrier, and different tone frequencies and tone combinations are used in the various paging systems. For example, one present day paging system uses single continuous tones of various frequencies to select the different receivers; other present day paging systems use two simultaneous tones; still others use sequentially transmitted bursts of tone signals of different frequencies; and still others use combinations of the foregoing.

The tone generator of the invention, as mentioned above, has particular utility in the servicing of selective call receivers which are used in the aforesaid different paging systems. Moreover, the tone generator of the invention has essentially universal application since it is capable of simulating the tones or tone combinations to which any particular receiver of any of the different present day paging systems has been set, and of achieving this quickly and conveniently without the need for a multiplicity of ancillary devices such as reed oscillators or the like.

For example, the tone generator to be described is capable of generating groups of up to four tone frequencies in a range of 0–10 KHz. The individual tone frequencies are set by thumbwheel controls to the nearest 0.1 Hz, that is, with a 5-digit resolution. Therefore, the tone generator of the invention is capable of generating easily and quickly, all of the variety of tones and tone combinations used in present day tone selective paging systems, this being achieved by means of simple adjustments.

As also explained above, the tone generator of the invention is capable of being set to diffferent modes of operation, whereby the aforesaid tones may be generated on a continuous, burst, sequential, simultaneous, or simultaneous/sequential basis. This is in order to simulate the actual conditions of any particular paging system, and in order to set the various tones for acceptance by the selective circuits of the receiver being serviced. The instrument of the invention has features in that all tone durations are calibrated and repeatable in all of its operational modes. The tone groups generated by the instrument of the invention, including first and second tone burst times and pause times, can be quickly preset on the instrument, and an entire group of tones can be repeated indefinitely at precisely timed intervals.

The instrument of the invention is actually an accessory tone generator for use with conventional signal generators which are capable of frequency modulating or amplitude modulating its tones on a selected carrier. In this way, the instrument of the invention permits the conventional signal generator to be used to service on a wide variety of various types of ton selective communications equipment, such as paging units, paging receivers, or the like, or any other type of electronic circuitry which incorporates selective tone networks and decoders.

DETAILED DESCRIPTION OF THE ILLUSTRATED EMBODIMENT

Figure 1:
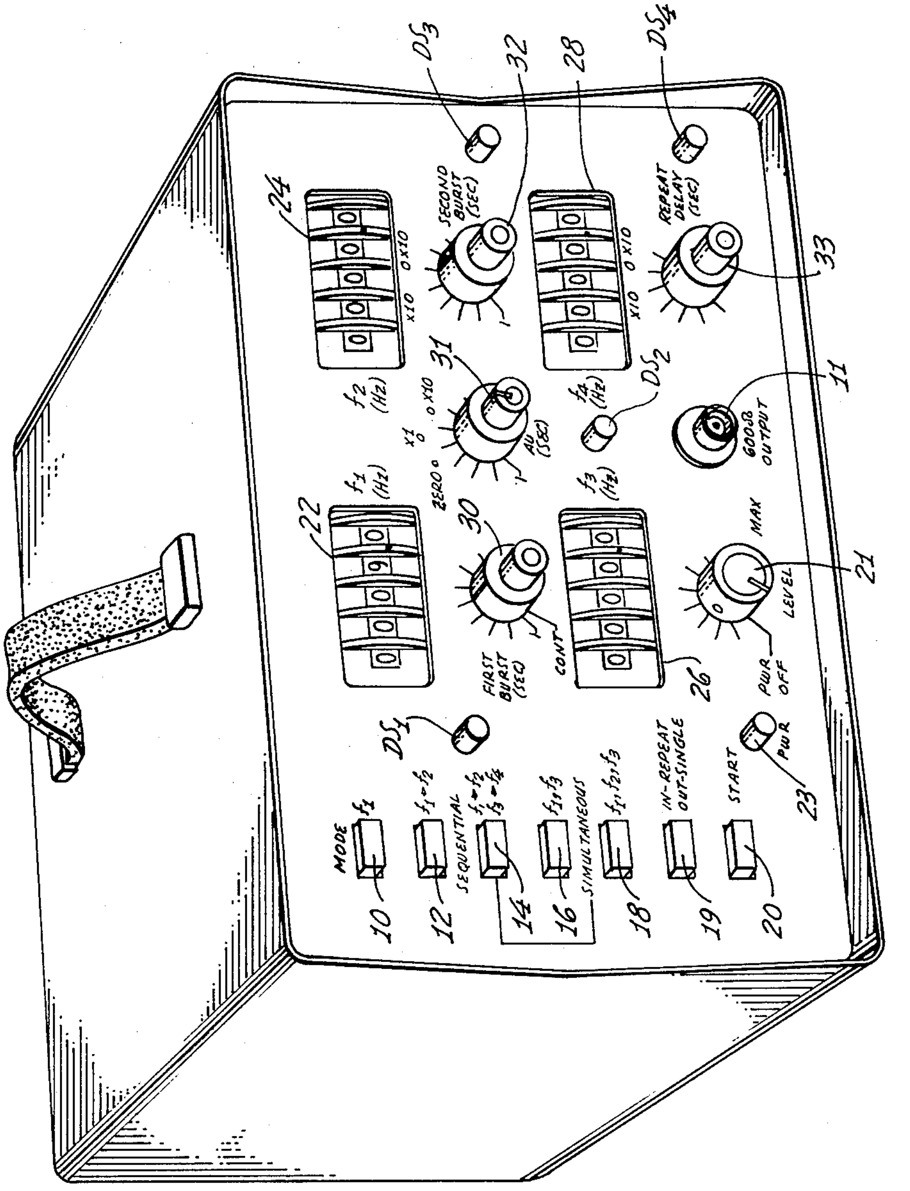
FIG. 1 is a perspective representation of a tone generator representing one embodiment of the invention.

The unit illustrated in FIG. 1 includes a front control panel, as shown, on which the various operating controls are located. A power switch and potentiometer 21 is provided for activating the unit and for controlling the amplitude of the output signals appearing at the output terminal 11. An indicator lamp 23 is illuminated when the power is on. Further indicator lights DS1, DS2, DS3 and DS4 are also provided on the front panel, whose function will be described. A row of pushbutton mode selection switches extends down the left-hand side of the control panel. These switches are designated 10, 12, 14, 16, 18, 19 and 20. When the switch 10 is depressed, a single tone ($f_1$) appears at the output terminal 11. The frequency of this tone may be selected by adjustment of a series of decade thumbwheel controls 22. Also, the tone may be continuous by appropriately setting a rotary switch 30, or it may appear in bursts. The duration of each burst may be controlled by setting the switch and potentiometer 30, and the interval between each burst may be controlled by setting a rotary switch and potentiometer 31. The switches and potentiometers 30 and 31 are conveniently calibrated in "seconds".

When the mode switch 12 is depressed, two tones appear in sequence at the output terminal 11. The frequency of the first tone ($f_1$) is set by the decade thumbwheel controls 22, and the frequency of the second tone ($f_2$) is set by setting the decade thumbwheel controls 24. The duration of the tone ($f_1$) is set by setting the rotary switch and potentiometer 30, the interval between the two tones is set by setting the rotary switch and potentiometer 31, and the duration of the second tone is set by setting the rotary switch and potentiometer 32. The tone sequence may be made to repeat at any desired interval by setting a third rotary time switch and potentiometer 33.

When the mode pushbutton switch 14 is depressed, the two tones ($f_1$) and ($f_2$) appear as sequential bursts at the output terminal 11, and the frequencies duration and spacing of the bursts may be set by setting the thumbwheel controls 22 and 24, and the rotary switches and potentiometers 30, 31 and 32, as explained above. In addition, two further tone bursts ($f_3$) and ($f_4$) appear at the output terminal 11, whose frequencies are set by setting decade thumbwheel controls 26 and 28, and which have the same duration and spacing as the tone bursts ($f_1$) and ($f_2$), as established by the setting of the rotary switches and potentiometers 30, 31 and 32. The frequencies ($f_1$) and ($f_3$) appear in the first burst; and the frequencies ($f_2$) and ($f_4$) appear in the second burst.

The two tones ($f_1$) and ($f_3$) may be produced together at the output terminal 11 by depressing the mode pushbutton switch 16; the frequency of the tones being established by setting the thumbwheel controls 22 and 26, and by setting the rotary switch 30. Likewise, the three tones ($f_1$), ($f_2$) and ($f_3$) may be produced simultaneously at the output terminal 11 by depressing the pushbutton mode control switch 18, these latter frequencies being set by the thumbwheel controls 22, 24 and 26, respectively. The mode switch 19 is a single/-repeat control which will be described, and the mode switch 20 is a "start" switch which also will be described.

It will be appreciated, therefore, that in the tone generator of the invention, the various modes are timed accurately by the front panel programming controls described above, so that exactly identical tone frequencies can be generated automatically, and so that the hit-and-miss manual timing of the prior art generators is obviated. As will be described, each frequency synthesizer channel of the tone generator of the invention derives its base frequency from a stable crystal oscillator which, in itself, is highly accurate, and which controls the accuracy of the output tone frequencies. The amplitude of the output tones can be varied by turning the knob associated with the power switch 21 so as to vary the associated potentiometer.

As described, the tone burst duration is controlled by the two rotary switches 30 and 32, while the third rotary switch 31 sets the pause time between the two bursts. In a constructed embodiment of the invention, each time control has two ranges of 0.1 second to 1 second, and 1 second to 10 seconds. The pause between the bursts can also be set from 0 to 10 seconds. The fourth rotary switch 33 sets the repetition rate of burst sequences from 0.5 to 50 seconds. The control of the operating modes is achieved by the simple pushbutton switches 10, 12, 14, 16, 18, 19 and 20, whereas the frequency of the individual tones is set by the decade thumbwheel controls 22, 24, 26 and 28, as described.

Figure 2:
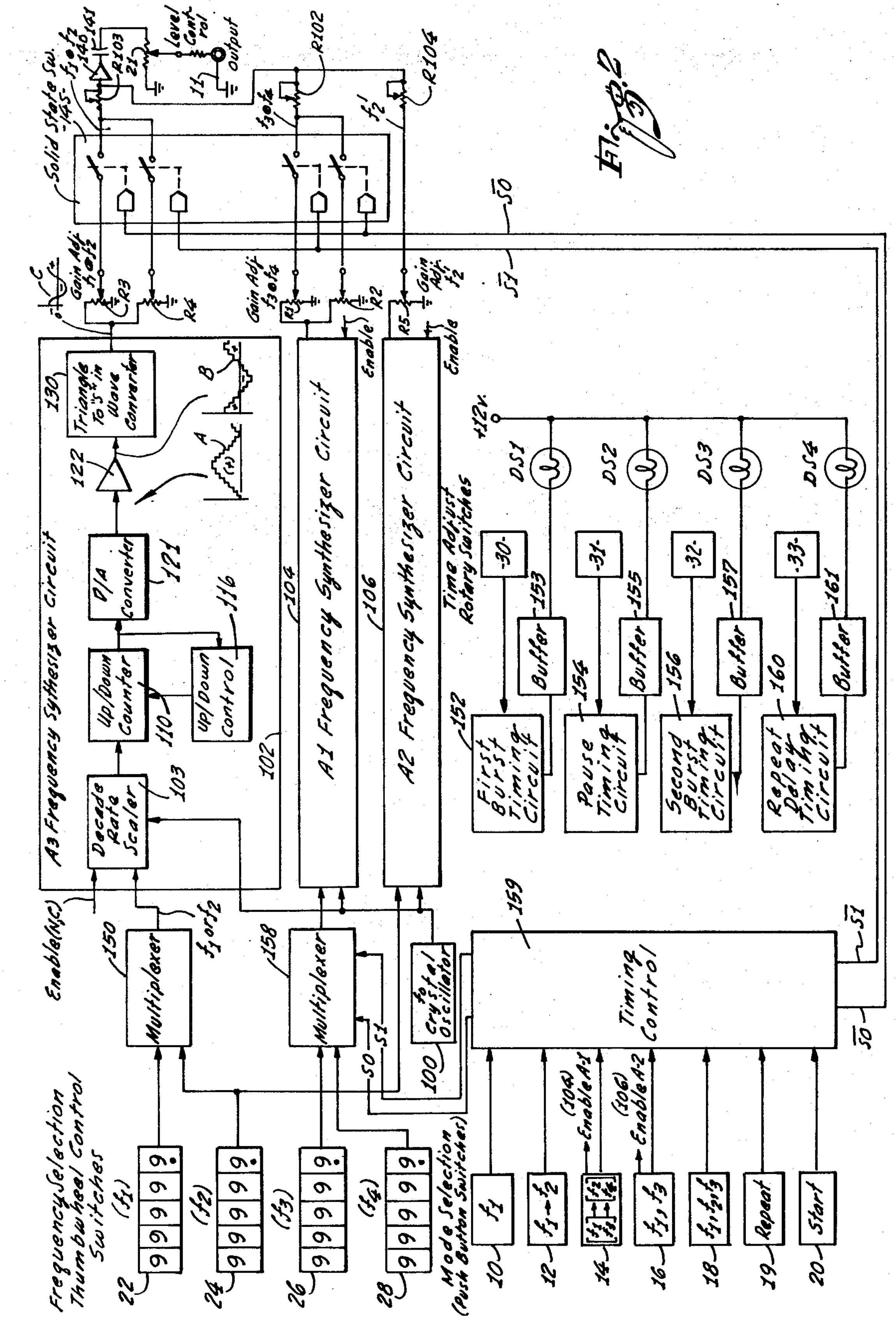
FIG. 2 is a schematic block diagram of the electronic circuitry incorporated into the tone generator of FIG. 1.

The system shown in FIG. 2 includes, for example, a stable-frequency crystal oscillator 100 having a frequency ($f_o$) of 1.98 MHz. The oscillator 100 is connected to three frequency synthesizer circuits designated 102, 104 and 106. Each frequency synthesizer includes a decade rate scaler (DRS), such as the unit 103. The decade rate scaler is a commercially available item, and it may be controlled in accordance with a binary decimal code to produce a pulse output which is variable, for example, from 1/100,000 $f_o$ to 99999/100,000 $f_o$, where $f_o$ is the frequency (1.98 MHz) of the crystal oscillator. The output of the decade rate scaler 103 is generally not uniform in pulse-to-pulse spacing, however, that factor is not critical since the DRS output is processed in a manner to be described so that a uniform sine wave may be produced.

The output of the DRS 103 is applied to an up-down counter 110, the output of the DRS in the circuit 104 is applied to a similar up-down counter, and the output of the DRS in the circuit 106 is connected to a similar up-down counter. The up-down counter 110 is a two decade type, and has appropriate control circuitry associated with it to sense a pre-selected maximum and minimum count, so as to reverse the counter automatically. The counter 110 has an up-down control 116, associated with it, and the counters in the circuits 104 and 106 each has an up-down control. Both the up-down counter 110 and its associated control 116, are commercially available items, so that there is no need to describe the circuit details involved in these units. The counter 110 is controlled, for example, so that it counts from 0 (0000 0000) to 99 (1001 1001), and then counts back down to 0.

The counter 110 is connected to a digital/analog converter in the form of a binary code decimal ladder network 121; and the up-down counters in the circuits 104 and 106 are connected to similar networks. The BCD ladder network 121 is also a commercially available item, and it responds to the count of its corresponding up-down counter 110 to produce an output which is basically a triangular wave, such as the wave A shown at the output of the network 121. The fact that the output of the DRS 103, for example, is somewhat irregular, as mentioned above, only slightly affects the shape of the wave A, and has no effect on its frequency.

Each triangular wave, such as the wave A, is amplified in an A.C. amplifier 122, and the resulting triangular wave B, on a zero axis is passed through a triangle to sine wave converter, such as the converter 130, so that the triangular wave is shaped into a sine wave, such as the sine wave C at the output of the converter 130. The converter 130 is also a commercially available item, and need not be described in circuit detail. The outputs from the three frequency synthesizers 102, 104 and 106 are all passed through a conventional summing amplifier 140 and through a coupling capacitor 141 to appear across the level control potentiometer 21 at the output terminal 11. Gain adjustment potentiometers R1, R2, R3, R4 and R5 are provided at the outputs of the frequency synthesizers 102, 104, 106, as shown. The time control circuits 159 control the setting of individual switches in a solid state switch block 145 to provide the desired outputs to the summing amplifier 140. Variable resistors R102, R103, R104 are provided for adjusting the levels of the outputs.

As mentioned above, the frequency of the individual tone signals ($f_1, f_2, f_3, f_4$) is controlled by setting the corresponding decade thumbwheel controls 22, 24, 26 and 28. The thumbwheel controls are included in corresponding binary coded decimal units, so that, in each instance, a binary coded decimal output is provided corresponding to the setting of the individual thumbwheel controls. Such units are known to the art, and are commercially available.

The outputs of the thumbwheel controls 22 qnd 24 ($f_1$ and $f_2$) are applied to a multiplexer 150, which includes a plurality of control gates. These gates are controlled, for example, by the pushbutton mode switches 10, 12, 14, 16 and 18. The control gates are also controlled by timing circuits 152 and 156 through a timing control circuit 159. These timing circuits 152 and 156, and similar timing circuits 154 and 160, are controlled by the various rotary switches 30, 31, 32 and 33, and by the start switch 20.

The thumbwheel controls 26 and 28 are connected to a multiplexer 158, which also includes a plurality of control gates. These gates are controlled by the timing circuits 152 and 156, as well as by the pushbutton mode switches 14, 16, 18.

The output of the multiplexer 150 controls the frequency synthesizer circuit 102, the output of the multiplexer 158 controls the frequency synthesizer circuit 104, and the output of the thumbwheel controls 24 controls the frequency synthesizer circuit 106. The specific logic gates included in the multiplexers 150 and 158 are of a known type and need not be shown in detail. This also applies to the circuitry in the timing circuits 152, 154, 156 and 160. These timing circuits may, for example, be one-shot multi-vibrators which are triggered from a stable to an unstable state, and which, in each instance, remain in the unstable state for a time interval established by the setting of the corresponding time adjust rotary switches and potentiometers 30, 31, 32 and 33. Whenever any one of the timing circuits 152, 154, 156 or 160 is energized, a corresponding indicator lamp DS1, DS2, DS3, DS4 is energized through corresponding buffers 153, 155, 157 and 161.

To set the instrument of the invention to a condition, for example, in which it produces a continuous tone signal $(f_1)$ at the output terminal 11, the thumbwheel control 22 is first set to a setting corresponding to the desired tone frequency of $f_1$, the time adjust rotary switch 30 is turned to a "continuous" setting. The multiplexer 150 passes the BCD output from the thumbwheel 22 to the decade rate scaler 103, so that the decade rate scaler is set to a frequency multiple corresponding to the selected frequency $(f_1)$. The up-down counter 110 is activated, and it causes the network 122 to develop the output wave A of the selected frequency $(f_1)$. This wave is transformed to the sine wave C in the converter 130, and the sine wave C appears at the desired frequency $(f_1)$ at the output terminal 11.

Now, if it is desired to produce two bursts of different tones, $(f_1)$ and $(f_2)$ at the output terminal 11, the mode pushbutton switch 12 is actuated, the time adjust rotary switch 30 is set to correspond to the desired duration of the first burst, the time adjust rotary switch 31 is set to correspond to the desired pause between bursts, and the time adjust rotary switch 32 is set to correspond to the desired duration of the second burst. The thumbwheel control 22 is set to the desired frequency of the first tone burst, and the thumbwheel control 24 is set to the desired frequency of the second tone burst. Then, when the start switch 20 is depressed, the multiplexer 150 causes the decade rate scaler 103 initially to be set to the frequency $(f_1)$ for a time interval determined by the first burst timing circuit 152 and corresponding to the setting of the time adjust rotary switch 30, so that a corresponding burst of tone $(f_1)$ appears for that interval at the output terminal 11. Then, the timing control circuit 159 disables the multiplexer 150 so that no signal is produced at the output terminal 11 for a predetermined pause time which is determined by the pause timing circuit 154 under the control of the time adjust rotary switch 31. At the end of the pause time, the timing control circuit 159 again activates the multiplexer 150 so that this time the tone frequency $(f_2)$ selected by thumbwheel 24 sets the decade rate scaler 103, so that a tone burst of frequency $(f_2)$ appears at the output 11 for a time interval determined by the second burst timing circuit 156, under the control of the time adjust rotary switch 32. The repeat delay timing circuit 160 under the control of the time adjust rotary switch 33 is incorporated to cause the operation to repeat at a desired time rate.

In like manner, the pushbutton mode switch 14 may be actuated to cause the tone bursts $(f_1)$ and $(f_2)$ to appear sequentially at the output terminal 11 together with the tone bursts $f_3$ and $f_4$. Likewise, the pushbutton mode switch 16 may be actuated to cause the tones $(f_1)$ and $(f_3)$ to appear continuously at the output 11, or the mode switch 18 may be actuated to cause the three tones $(f_1)$, $(f_2)$ and $(f_3)$ to appear simultaneously at the output terminal 11.

The invention provides, therefore, an improved tone generator which is constructed so that a multiplicity of different tones and tone combinations may be synthesized on a digital basis. The instrument of the invention is relatively simple and inexpensive in its construction, and it provides for a wide range of frequency variations for the individual tones to be digitally effectuated, with the individual set frequencies of the various tones being accurately controlled precisely to represent the intended frequency.

The embodiment of the invention described herein, for example, is capable of generating groups of up to four tone frequencies anywhere in the range of 0–10 KHz. As also described, the frequencies of the illustrated embodiment can be set on thumb-wheel controls to the nearest 1/10 of 1 Hz, that is, with a 5 digit resolution. The tone generator of the invention, therefore, is capable of generating the entire universe of tones used in a wide variety of tone selective paging systems, and the like, so that the system has material advantages over the prior art reed type of tone generator which is limited to a small number of discrete frequencies.

The instrument of the invention introduces a high degree of automation and precision to tone code testing. This is because all tone durations are calibrated and are repeatable in all the various modes of operation of the instrument, including, for example, continuous, burst, sequential and simultaneous. Tone groups, including first and second burst times and pause times, can be preset in the instrument, as described above, and the instrument may be controlled so that the entire group can be repeated indefinitely at precise intervals. An important feature of the digital sine wave synthesizing system is that frequency accuracy of the order of ±.005%, or better, can be achieved for each tone setting.

While a particular embodiment of the invention has been shown and described, modifications may be made. It is intended in the following claims to cover all such modifications which come within the spirit and scope of the invention.

What is claimed is:

1. A digital tone generator for producing at least one tone signal comprising: an oscillator for generating a reference signal having a predetermined reference frequency; a first decade rate scaler unit connected to said oscillator and responsive to said reference signal; a first manually adjustable binary coded decimal unit connected to said first decade rate scaler and adjustable to a predetermined decimal setting to produce a corresponding first binary coded decimal output and to apply said first binary coded decimal output to said first decade rate scaler to cause said first decade rate scaler to produce a first pulse output signal of a frequency corresponding to a predetermined sub-multiple of said reference signal as determined by said first binary coded output; a second manually adjustable binary coded decimal unit adjustable to a predetermined decimal setting to produce a corresponding second binary coded decimal output; logic circuitry selectively connecting said first binary coded decimal unit and said second binary coded decimal unit to said first decade rate scaler; manually adjustable timing circuitry connected to said logic circuitry for determining the time intervals in which said first binary coded decimal unit and said second binary coded decimal unit are connected to said first decade rate scaler; a second decade rate scaler connected to said oscillator and responsive to said reference signal; a third manually adjustable binary coded decimal unit connected to said second decade rate scaler and adjustable to a predetermined decimal setting to produce a corresponding third binary coded decimal output and to apply said third binary coded decimal output to said second decade rate scaler to cause said second decade rate scaler to produce a second pulse output signal of a frequency corresponding to a predetermined sub-multiple of said reference signal; a first up-down counter coupled to said first decade rate scaler and responsive to said first pulse output signal therefrom; a control circuit coupled to said first up-down counter for reversing the count thereof at a predetermined maximum and minimum count; a first digital/analog converter connected to said first updown counter for producing a first triangular wave having a selected frequency corresponding to the setting of said first or second binary coded decimal unit; a first triangular wave-sine wave converter connected to said first digital/analog converter and responsive to said first triangular wave for producing a corresponding first sine wave; a second up-down counter coupled to said second decade rate scaler and responsive to said second pulse output signal; a control circuit connected to said second up-down counter for reversing the count thereof at a predetermined maximum and minimum count; a second digital/analog converter connected to said second up-down counter for producing a second triangular wave having a selected frequency corresponding to the setting of said third binary coded decimal unit; a second triangular wave-sine wave converter coupled to said second digital/analog converter and responsive to said second triangular wave for producing a corresponding second sine wave; and means including a summing amplifier connected to said first sine wave converter and to said second sine wave converter for producing first and second tone frequencies at the tone generator output.

2. The digital tone generator defined in claim 1, and which includes a fourth manually adjustable binary coded decimal unit; and a second logic circuit for selectively connecting said third binary coded decimal unit and said fourth binary coded decimal unit to said second decade rate scaler for causing said second digital/analog converter to produce a pair of triangular waves having selected frequencies corresponding respectively to the setting of said third and fourth binary coded decimal units.

* * * * *